(12) United States Patent
Zhang et al.

(10) Patent No.: US 10,713,421 B2
(45) Date of Patent: Jul. 14, 2020

(54) SYSTEMS AND METHODS FOR CONVERTING STATIC IMAGE ONLINE CONTENT TO DYNAMIC ONLINE CONTENT

(71) Applicant: Google LLC, Mountain View, CA (US)

(72) Inventors: Guannan Zhang, Shanghai (CN); Kai Ye, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 1 day.

(21) Appl. No.: 16/127,773

(22) Filed: Sep. 11, 2018

(65) Prior Publication Data

US 2019/0005008 A1 Jan. 3, 2019

Related U.S. Application Data

(63) Continuation of application No. 14/875,321, filed on Oct. 5, 2015, now abandoned, which is a continuation
(Continued)

(51) Int. Cl.
| | |
|---|---|
| *G06F 40/151* | (2020.01) |
| *H04N 21/422* | (2011.01) |
| *H04N 21/433* | (2011.01) |
| *H04N 21/44* | (2011.01) |
| *H04N 21/45* | (2011.01) |

(Continued)

(52) U.S. Cl.
CPC ............ *G06F 40/151* (2020.01); *G06F 40/14* (2020.01); *G06K 9/18* (2013.01); *G06T 7/90* (2017.01); *H04N 21/422* (2013.01); *H04N 21/42203* (2013.01); *H04N 21/4331* (2013.01); *H04N 21/44008* (2013.01); *H04N 21/4524* (2013.01);
(Continued)

(58) Field of Classification Search
None
See application file for complete search history.

(56) References Cited

U.S. PATENT DOCUMENTS

| | | |
|---|---|---|
| 7,996,753 B1 | 8/2011 | Chan et al. |
| 8,392,538 B1 | 3/2013 | Lee |

(Continued)

FOREIGN PATENT DOCUMENTS

| | | | |
|---|---|---|---|
| CN | 101414297 A | 4/2009 | |
| CN | 101477699 A | 7/2009 | |

(Continued)

OTHER PUBLICATIONS

International Search Report & Written Opinion on PCT/CN2013/001675 dated Oct. 14, 2014.
(Continued)

*Primary Examiner* — Howard Cortes
(74) *Attorney, Agent, or Firm* — Foley & Lardner LLP

(57) ABSTRACT

A content conversion computer system for converting static image content to dynamic content includes a memory for storing data and a processor in communication with the memory. The processor is configured to receive a static image content having a plurality of image characteristics, analyze the static image content to determine the plurality of image characteristics, determine a plurality of dynamic content characteristics used for converting the static image content to a dynamic content, and generate the dynamic content based upon the image characteristics and the dynamic content characteristics.

20 Claims, 6 Drawing Sheets

Related U.S. Application Data of application No. PCT/CN2013/001675, filed on Dec. 31, 2013.

(51) Int. Cl.
*H04N 21/472* (2011.01)
*H04N 21/81* (2011.01)
*G06T 7/90* (2017.01)
*G06F 40/14* (2020.01)
*G06K 9/18* (2006.01)

(52) U.S. Cl.
CPC ..... *H04N 21/47205* (2013.01); *H04N 21/812* (2013.01)

(56) References Cited

U.S. PATENT DOCUMENTS

| | | |
|---|---|---|
| 9,082,198 B2 | 7/2015 | Mashiah |
| 9,298,356 B2* | 3/2016 | Song .................. G06F 3/04845 |
| 2008/0001950 A1* | 1/2008 | Lin ........................ G06T 13/80 345/473 |
| 2008/0115055 A1* | 5/2008 | Sadovsky ........... G06F 17/2264 715/255 |
| 2008/0158230 A1 | 7/2008 | Sharma et al. |
| 2010/0182501 A1* | 7/2010 | Sato ........................ G06T 11/60 348/441 |
| 2011/0080424 A1* | 4/2011 | Peters ................... H04N 1/387 345/620 |
| 2012/0011282 A1 | 1/2012 | Williams et al. |
| 2012/0158519 A1 | 6/2012 | Edwards |
| 2012/0158525 A1 | 6/2012 | Kae et al. |
| 2012/0216107 A1* | 8/2012 | Iwabuchi ........... G06Q 30/0241 715/231 |
| 2012/0284610 A1* | 11/2012 | Masuko ................ G06F 16/972 715/234 |
| 2013/0009981 A1 | 1/2013 | Kruglick |
| 2013/0083999 A1 | 4/2013 | Bhardwaj et al. |
| 2013/0111056 A1 | 5/2013 | Prasad |
| 2013/0163953 A1* | 6/2013 | Peacock ................ G06F 9/5016 386/231 |
| 2014/0123021 A1* | 5/2014 | Walkin .................... G06F 9/451 715/746 |
| 2014/0340409 A1* | 11/2014 | Murphy-Chutorian ...................... G06T 13/80 345/473 |
| 2015/0199837 A1* | 7/2015 | Wang ...................... G06T 13/80 345/475 |
| 2016/0212475 A1* | 7/2016 | Taxier ................ H04N 21/4312 |

FOREIGN PATENT DOCUMENTS

| | | |
|---|---|---|
| CN | 102054285 A | 5/2011 |
| CN | 102833625 A | 12/2012 |

OTHER PUBLICATIONS

U.S. Office Action on U.S. Appl. No. 14/875,321 dated Dec. 11, 2017.

* cited by examiner

SYSTEMS AND METHODS FOR CONVERTING STATIC IMAGE ONLINE CONTENT TO DYNAMIC ONLINE CONTENT

CROSS-RELATED APPLICATION

This application is a U.S. Continuation Application under 35. U.S.C. § 120 of U.S. application Ser. No. 14/857,321 filed on Oct. 5, 2015, which is a Continuation of International Application No. PCT/CN2013/001675, filed Dec. 31, 2013, entitled "SYSTEMS AND METHODS FOR CONVERTING STATIC IMAGE ONLINE CONTENT TO DYNAMIC ONLINE CONTENT," both applications are incorporated herein by reference in their entirety.

BACKGROUND

This description relates to online content, and more particularly, to methods and systems for converting static image online content to dynamic online content.

At least some online content, such as online advertisements ("ads"), are created and stored in the form of static images. Static images may include, for example, static image files and static images stored in non-file formats. Alternately, static images may also include progressive image files including a series of static images where each static image is displayed for a fixed duration of time. Additionally, some static images may be stored in physical formats. Such static images typically have fixed pixel dimensions or ratios for the boundaries of the static images. Due to such fixed dimensions or ratios of the borders of the static images, effectively serving such static images in a variety of online publications may be difficult.

BRIEF DESCRIPTION OF THE DISCLOSURE

In one aspect, a computer-implemented method for converting static image content to dynamic content is provided. The method is implemented by a content conversion computer system coupled to a memory. The method includes receiving a static image content having a plurality of image characteristics, analyzing the static image content to determine the plurality of image characteristics, determining a plurality of dynamic content characteristics used for converting the static image content to a dynamic content, and generating the dynamic content based upon the image characteristics and the dynamic content characteristics.

In another aspect, a content conversion computer system for converting static image content to dynamic content is provided. The content conversion computer system includes a memory for storing data and a processor in communication with the memory. The processor is configured to receive a static image content having a plurality of image characteristics, analyze the static image content to determine the plurality of image characteristics, determine a plurality of dynamic content characteristics used for converting the static image content to a dynamic content, and generate the dynamic content based upon the image characteristics and the dynamic content characteristics.

In another aspect, a computer-readable storage device having processor-executable instructions embodied thereon, for converting static image content to dynamic content is provided. When executed by a computing device, the processor-executable instructions cause the computing device to receive a static image content having a plurality of image characteristics, analyze the static image content to determine the plurality of image characteristics, determine a plurality of dynamic content characteristics used for converting the static image content to a dynamic content, and generate the dynamic content based upon the image characteristics and the dynamic content characteristics.

In another aspect, a system for converting static image content to dynamic content is provided. The system includes means for receiving a static image content having a plurality of image characteristics, means for analyzing the static image content to determine the plurality of image characteristics, means for determining a plurality of dynamic content characteristics used for converting the static image content to a dynamic content, and means for generating the dynamic content based upon the image characteristics and the dynamic content characteristics.

In another aspect, the system described above is provided, wherein the system further includes means for retrieving the static image content from an online content repository.

In another aspect, the system described above is provided, wherein the system further includes means for using an optical character recognition (OCR) engine to identify textual characteristics.

In another aspect, the system described above is provided, wherein the system further includes means for determining at least one of headline text and description text.

In another aspect, the system described above is provided, wherein the system further includes means for using an edge engine to determine image display characteristics.

In another aspect, the system described above is provided, wherein the system further includes means for using a color engine to determine color characteristics.

In another aspect, the system described above is provided, wherein the system further includes means for determining that the static image content is a progressive image content having a plurality of static images, means for analyzing the static image content associated with each of the plurality of static images to determine a plurality of image characteristics associated with the progressive image content, means for determining a plurality of dynamic content characteristics used for converting the plurality of image characteristics associated with the progressive image content to a dynamic content, and means for generating the dynamic content based upon the image characteristics and the dynamic content characteristics, wherein the dynamic content is substantially animated based, at least partially, on the progressive image content.

In another aspect, the system described above is provided, wherein the system further includes means for retrieving the plurality of dynamic content characteristics from the memory, and means for receiving the plurality of dynamic content characteristics from a content server.

In another aspect, the system described above is provided, wherein the system further includes means for generating a plurality of HTML content substantially including the plurality of image characteristics, wherein the plurality of HTML content is associated with a plurality of dimensions and a plurality of orientations.

In another aspect, the system described above is provided, wherein the system further includes means for generating a plurality of HTML content wherein the HTML content is animated.

The features, functions, and advantages described herein may be achieved independently in various embodiments of the present disclosure or may be combined in yet other embodiments, further details of which may be seen with reference to the following description and drawings.

Figure 1:
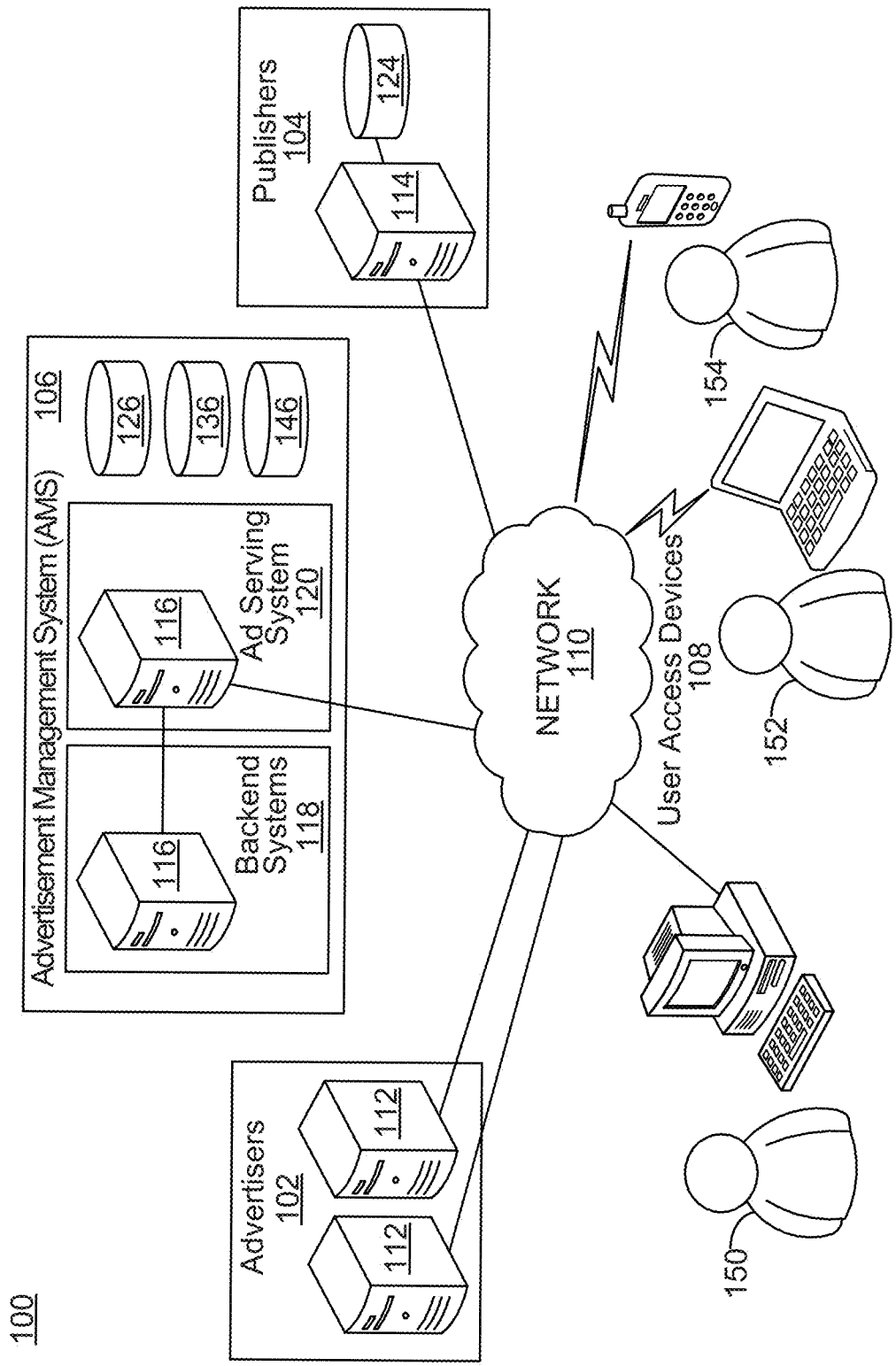
FIG. 1 is a diagram depicting an example advertising environment.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations refers to the accompanying drawings. The same reference numbers in different drawings may identify the same or similar elements. Also, the following detailed description does not limit the claims.

This subject matter described herein relates generally to online content and, more specifically, to converting online content such as static image online content to dynamic content. As used herein, static image online content refers to static images refers to any image file that may be served as online content. Accordingly, static image online content may be of any appropriate file format including, for example and without limitation, graphics interchange format (.gif files), joint photographic expert group format (.jpeg files), bitmap image file format (.bmp files), WebP format (.webp files), PostScript format (.ps files), tagged image file format (.tiff files), and any other file format that may be used to encode depictions of images and serve such images. Further, static image online content, as used herein, also includes progressions of frames of any static image file. For example, animated gifs that use a fixed number of frames and display each frame in a time sequence are, as described herein, static image online content. Static images may also include, as described herein, printed images. As used herein, printed images must first be converted to a file format such as described above in order to convert the printed images to dynamic content using, for example, scanning. Typically, static images have fixed dimensions of size or fixed ratios between the boundaries of the static image.

At least some online publications such as websites may be configured to display online content (e.g., advertisements). Such online content publications have designated locations used to display online advertisements. Such designated locations may be known as online "real estate." In at least some cases, online real estate is associated with specific fixed pixel dimensions or ratios for the boundaries of the online real estate. When online advertisements are not associated with fixed pixel dimensions or ratios that correspond to the fixed pixel dimensions or ratios of the online real estate, problems may occur in serving such online advertisements to such online real estate. In one example, portions of online real estate may not be utilized when an online advertisement not matching the required online real estate is served. In another example, portions of the online advertisement may be compressed, distorted, or obscured. In additional examples, such online advertisements may simply not be served due to the lack of corresponding dimensions or ratios. As a result, the static images can only be properly served into certain online real estate of certain online publications. Further, at least some static images may benefit from being animated to highlight features of the static images. Application of animation may make the online content more visible or visually interesting and allow a viewer to more easily identify the online content for a follow-up action.

The methods and systems described herein facilitate the conversion of such static image online content to dynamic content and thereby allow the serving of such dynamic content in a plurality of online real estate for a plurality of online publications and also providing animated forms of such dynamic content. The methods and systems are implemented by a content conversion computer system.

A content conversion computer system receives a static image content having a plurality of image characteristics. For example, the static image content may include a combination of textual characteristics, image display characteristics, and color characteristics. The content conversion computer system may receive the static image content from any suitable source including for example and without limitation, an online content repository, crawling a plurality of web locations, an offline content repository, scanning physical images into static image online content using a scanning device, an advertiser network, online publications, and an online merchant. In the example embodiment, the content conversion computer system receives the static image content from an online content repository.

The content conversion computer system is configured to analyze details of the static image content. More specifically, the content conversion computer system identifies at least some of the plurality of image characteristics associated with the static image. Accordingly, the content conversion computer system is capable of identifying textual characteristics, image display characteristics, and color characteristics. The content conversion computer system includes a plurality of components that are used to identify the plurality of image characteristics. In the example embodiment, the content conversion computer system analyzes the content of static image content and identifies a background area, at least one image area such as a "product image area", and text blocks. The content conversion computer system may use machine vision algorithms, optical character recognition, edge detection engines, and color clustering engines to make such identifications.

In the example embodiment, the content conversion computer system uses an optical character recognition (OCR) engine to identify textual characteristics of the static image content. Depending upon the condition of the image and the legibility of the text, the content conversion computer system may use a pre-processing method with its OCR engine to improve the quality of the textual recognition. Accordingly, the content conversion computer system may apply deskewing, despeckling, binzarization, line removal, layout analysis, zoning, line and word detection, character isolation or segmentation, normalization of aspect ratio or scale, or any other suitable pre-processing methods. After pre-processing, the content conversion computer system may apply an OCR algorithm such as matrix matching or feature extraction to make determinations on the characters displayed within the static image content. Alternately, any OCR algorithm is used to determine the characters displayed in the static image content. Further, the content conversion computer system may use algorithms to distinguish the formatting and size of words within the static image content including, for example, determining the presence of bold characters, determining the presence of italicized characters, determining the presence of underlined characters, determining the presence of superscripted characters, determining the presence of subscripted characters, determining font sizes associated with characters, and determining font faces associated with characters. Additionally, the content conversion computer system may apply post processing methods and algorithms to verify determinations made by the OCR algorithms. For example, a particular static image content is known to be associated with certain key terms because it is associated with a particular merchant. Accordingly, a lexicon is applied to verify that words identified by the OCR engine correspond to words associated with that merchant. The OCR engine accordingly allows the content conversion computer system to identify textual elements, formatting and styling related to textual elements, and placement of textual elements. As described below, during the generation of dynamic content, the content conversion computer system can substantially place, style, and format the textual elements in a similar manner within the dynamic content as was displayed in the static image content. As described above, in the example embodiment, the OCR engine analyzes text contained within the previously identified "text blocks." In alternative embodiments, the OCR engine may analyze all textual elements available within static image content.

The content conversion computer system also uses an edge engine to determine image display characteristics. As used herein, an edge engine or an edge detection engine, refers to at least one method for identifying characteristics within a digital image to find discontinuities. In at least some examples, edge detection engines examine digital images such as static image content to find significant changes in brightness characteristics. At such points of brightness changes (or other discontinuities), "features" of an image can be separated. Accordingly, an edge detection engine can identify the boundaries of images components within the static image content. For example, in at least a variety of static image content, multiple interior images are included. Such interior images may include, for example, depictions of a product or service, a corporate logo, and photographs of humans using goods and services related to the static image content. The edge engine allows each interior image or "feature" to be identified. Upon determining the boundaries and position of such interior images or features, the content conversion computer system can further extract each interior image or feature while also identifying the absolute and relative position of such features within the static image content. Extraction is performed using any suitable method including, for example, cropping, cutting, and copying of the features based upon boundaries identified by the edge detection engine. In the example embodiment, extraction includes cropping features identified by the edge detection engine. As described below, the interior image or feature can then be placed at an absolute or relative position similar to the identified position within the generated dynamic content. As described above, in the example embodiment, the edge engine analyzes image characteristics contained within the previously identified "image areas." In alternative embodiments, the edge engine may analyze all image characteristics available within static image content.

The content conversion computer system additionally uses a color engine to determine color characteristics related to the static image content. As used herein, the color engine refers to at least one method for identifying dominant colors and their associated "weights" within image content. In the example embodiment, the color engine analyzes color in the previously identified "image areas." In alternative embodiments, the color engine analyzes the entire static image content. The color engine may apply any appropriate method including, for example, clustering algorithms, k-means algorithms, or any other suitable color identification and analysis methods and algorithms.

Further, using the edge engine and the OCR engine, the content conversion computer system identifies attributes associated with textual elements. In at least some static image content, a variety of textual elements are included. For example, a primary textual element or a "headline" may be included wherein the headline states a primary slogan, statement, or identifier associated with the static image content. The headline may be distinguished from other textual elements based upon, for example, the placement of the textual element within the static image content, the size of the font of the textual element in relation to the other textual elements, and the font face associated with the textual element in relation to the other textual elements. In a second example, a secondary textual element or a "description" may be included wherein the description provides details related to the static image content. The description may be distinguished from other textual elements based upon, for example, the length in characters of the textual element in relation to the other textual elements, the placement of the textual element within the static image content, and the font size associated with the textual element in relation to the font size of the other textual elements. In a third example, a tertiary textual element or a "call to action" may be included wherein the call to action invites a viewer such as a customer to click on a button or a link to navigate to, for example, an online merchant associated with the static image content. The call to action may be distinguished from other textual elements based upon, for example, the placement of the textual element within the static image content, the placement of the textual image onto a graphical button or clickable item, and the font size associated with the textual element in relation to the font size of the other textual elements. Accordingly, the edge engine and the optical character recognition engine of the content conversion computer system identify all such elements described above to determine headline text, description text, and call to action text. The content conversion computer system may additionally use the edge engine and the optical character recognition engine to determine other specified textual elements including, for example, a textual company logo, a contact email address, a contact phone number, and a contact physical address. A textual company logo may be distinguished based upon, for example, font size, location, and font type. Alternately, a textual company logo may be distinguished by comparison of the characters to a lexicon. Email addresses, phone numbers, and physical addresses may be distinguished based upon the standardized formatting of the characters into recognizable patterns.

As described herein, at least some image content includes a plurality of image content as "frames" of an "animated"

image. However, in at least some examples including progressive image files, the "animated" content is a plurality of static image content. Accordingly, the content conversion computer system is configured to identify the presence of a "frame" based animation and accordingly parse out each of the plurality of static image content. Once separated, each "frame" can be analyzed and converted using the content conversion computer system. Further, in at least some cases, the content conversion computer system creates dynamic content that is animated in a substantially similar manner to the animated static image content. The content conversion computer system otherwise applies the same methods to the analysis and conversion of animated static image content that it applies to non-animated static image content.

The content conversion computer system additionally determines a plurality of dynamic content characteristics to be used for converting the static image content to a dynamic content. The plurality of dynamic content characteristics include, for example, dimensions associated with the plurality of dynamic content, animation templates associated with the plurality of dynamic content, and styles and formatting characteristics associated with the plurality of dynamic content. The dynamic content characteristics may be retrieved from the memory of the content conversion computer system, a content server, a database, or any other computing device in communication with the content conversion computer system.

The content conversion computer system generates dynamic content based upon the image characteristics and dynamic content characteristics. Generating dynamic content substantially represents applying the previously determined image characteristics and dynamic content characteristics to create a plurality of dynamic content. In the example embodiment, dynamic content is generated by building styles based upon a combination of the determined image characteristics and the dynamic content characteristics. Building styles further includes selecting at least one size and orientation for the dynamic content, at least one font type for textual elements, at least one font size for textual elements, at least one location for image elements, and at least one color scheme for image elements and textual elements. Further, building styles may also include selecting to animate at least a portion of the dynamic content. After building styles, the content conversion computer system builds a plurality of dynamic content. The plurality of dynamic content may be associated with different sizes and orientations, different font types, different font sizes, different image element locations, different animations, and different color schemes. Accordingly, the content conversion computer system may substantially generate dynamic content with a variety of presentation styles, presentation sizes, and presentation appearances. Such a plurality of dynamic content may be useful in serving suitable online content to a variety of real estate for a variety of online publications. In at least one example, each generated dynamic content is inventoried for its characteristics. Accordingly, when a content server chooses dynamic content to serve into a particular piece of real estate for a particular online publication, characteristics for serving may be easily identified. For example, a particular piece of real estate for a particular online publication may have a known requirement of animation, a requirement for a particular size and orientation, and a requirement for particular color scheme. A content server can accordingly identify the appropriate dynamic content from the plurality of dynamic content based upon the inventoried data. In at least one example, such inventoried data regarding the characteristics of the dynamic content is included as metadata within the dynamic content. In other examples, the inventoried data is included in a database, a file, or any other suitable form.

In a first example, generating dynamic content includes generating a plurality of HTML 5 content with a plurality of distinct sizes, dimensions, and orientations. In other examples, the dynamic content can be generated as HTML 4 content or any other appropriate content format including earlier or later versions of HTML. In a second example, generating dynamic content includes generating a plurality of HTML 5 content with at least one animation. In other examples, the dynamic content can be generated as HTML 4 content or any other appropriate content format including earlier or later versions of HTML. The animation, as referenced above and described below, is selected based upon dynamic content characteristics. For example, the dynamic content characteristics may indicate that the dynamic content includes a "fade in", a "fade out", a "highlight", or any other suitable form of animation. Such animation is applied to at least a portion of the dynamic content.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may be achieved by performing one of the following steps: (a) receiving a static image content having a plurality of image characteristics; (b) analyzing the static image content to determine the plurality of image characteristics; (c) determining a plurality of dynamic content characteristics used for converting the static image content to a dynamic content; (d) generating the dynamic content based upon the image characteristics and the dynamic content characteristics; (e) retrieving the static image content from an online content repository; (f) using an optical character recognition (OCR) engine to identify textual characteristics; (g) determining at least one of headline text and description text; (h) using an edge engine to determine image display characteristics; (i) using a color engine to determine color characteristics; (j) determining that the static image content is a progressive image content having a plurality of static images, analyzing the static image content associated with each of the plurality of static images to determine a plurality of image characteristics associated with the progressive image content, determining a plurality of dynamic content characteristics used for converting the plurality of image characteristics associated with the progressive image content to a dynamic content, and generating the dynamic content based upon the image characteristics and the dynamic content characteristics, wherein the dynamic content is substantially animated based, at least partially, on the progressive image content; (k) retrieving the plurality of dynamic content characteristics from the memory; (l) receiving the plurality of dynamic content characteristics from a content server; (m) generating a plurality of HTML content substantially including the plurality of image characteristics, wherein the plurality of HTML content is associated with a plurality of dimensions and a plurality of orientations; and (n) generating a plurality of HTML content wherein the HTML content is animated.

FIG. 1 is a diagram depicting an example online content environment 100. Online content environment 100 may be used in the context of serving online advertisements to a user, including a user of a mobile computing device, in combination with online publications. With reference to FIG. 1, example environment 100 may include one or more advertisers 102 (i.e., online content providers), one or more publishers 104, an advertisement management system (AMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content. AMS 106 may also be referred to as a content management system 106.

The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to as sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable by a user. In some examples, an ad impression may occur when an ad is displayed on a display device of a user access device. An ad group refers, for example, to an entity that represents a group of creatives that share a common characteristic, such as having the same ad selection and recommendation criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, and/or maintain ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. "Publishers," in particular, include authors of content, wherein authors may be individual persons, or, in the case of works made for hire, the proprietor(s) who hired the individual(s) responsible for creating the online content. The term "content" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed publications, or any other form of information that may be presented to a user using a computing device such as one of user access devices 108.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with additional sets of content, for example ads, that are related or relevant to the retrieved content for display to users 150, 152, and 154. As discussed further below, these relevant ads may be provided from the AMS 106 and may be combined with content for display to users 150, 152, and 154. In some examples, the publishers 104 may retrieve content for display on a particular user access device 108 and then forward the content to the user access device 108 along with code that causes one or more ads from the AMS 106 to be displayed to the user 150, 152, or 154. As used herein, user access devices 108 may also be known as customer computing devices 108. In other examples, the publishers 104 may retrieve content, retrieve one or more relevant ads (e.g., from the AMS 106 or the advertisers 102), and then integrate the ads and the article to form a content page for display to the user 150, 152, or 154.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or selective provision and recommendation of ads through the environment 100 to the user access devices 108. In some configurations, the AMS 106 may include or access functionality associated with managing online content and/or online advertisements, particularly functionality associated with serving online content and/or online advertisements to mobile computing devices.

The AMS 106 may include one or more data processing systems 116, such as servers or embedded systems, coupled to the network 110. In the example embodiment, data processing system 116 is content conversion computer system 116 and is accordingly configured to perform the methods described herein including, for example, receiving a static image content having a plurality of image characteristics, analyzing the static image content to determine the plurality of image characteristics, determining a plurality of dynamic content characteristics used for converting the static image content to a dynamic content, and generating the dynamic content based upon the image characteristics and the dynamic content characteristics.

AMS 106 can also include one or more processes, such as server processes. In some examples, the AMS 106 may include an ad serving system 120 and one or more backend processing systems 118. The ad serving system 120 may include one or more data processing systems 116 and may perform functionality associated with delivering ads to publishers or user access devices 108. The backend processing systems 118 may include one or more data processing systems 116 and may perform functionality associated with identifying relevant ads to deliver, processing various rules, performing filtering processes, generating reports, maintaining accounts and usage information, and other backend system processing. The AMS 106 can use the backend processing systems 118 and the ad serving system 120 to selectively recommend and provide relevant ads from the advertisers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AMS 106 provides various advertising management features to the advertisers 102. The AMS 106 advertising features may allow users to set up user accounts, set account preferences, create ads, select keywords for ads, create campaigns or initiatives for multiple products or businesses, view reports associated with accounts, analyze costs and return on investment, selectively identify customers in different regions, selectively recommend and provide ads to particular publishers, analyze financial information, analyze ad performance, estimate ad traffic, access keyword tools, add graphics and animations to ads, etc.

The AMS 106 may allow the advertisers 102 to create ads and input keywords or other ad placement descriptors for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. Other actions include haptic feedback or gyroscopic feedback to generate a click-through. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks, directly or implicitly (e.g., through haptic or gyroscopic feedback), on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. The AMS 106 may deliver ads (associated with the advertisers 102) to the user access devices 108 when users access content from the publishers 104. The AMS 106 can be configured to deliver ads that are relevant to publisher sites, site content, and publisher audiences.

In some examples, the AMS 106 may crawl content provided by the publishers 104 and deliver ads that are relevant to publisher sites, site content and publisher audiences based on the crawled content. The AMS 106 may also selectively recommend and/or provide ads based on user information and behavior, such as particular search queries performed on a search engine website, or a designation of an ad for subsequent review, as described herein, etc. The AMS 106 may store user-related information in a general database 146. In some examples, the AMS 106 can add search services to a publisher site and deliver ads configured to provide appropriate and relevant content relative to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to selectively recommend and provide ads created by the advertisers 102 to the user access devices 108 directly or through the publishers 104. The AMS 106 may selectively recommend and provide ads to a particular publisher 104 (as described in further detail herein) or a requesting user access device 108 when a user requests search results or loads content from the publisher 104.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
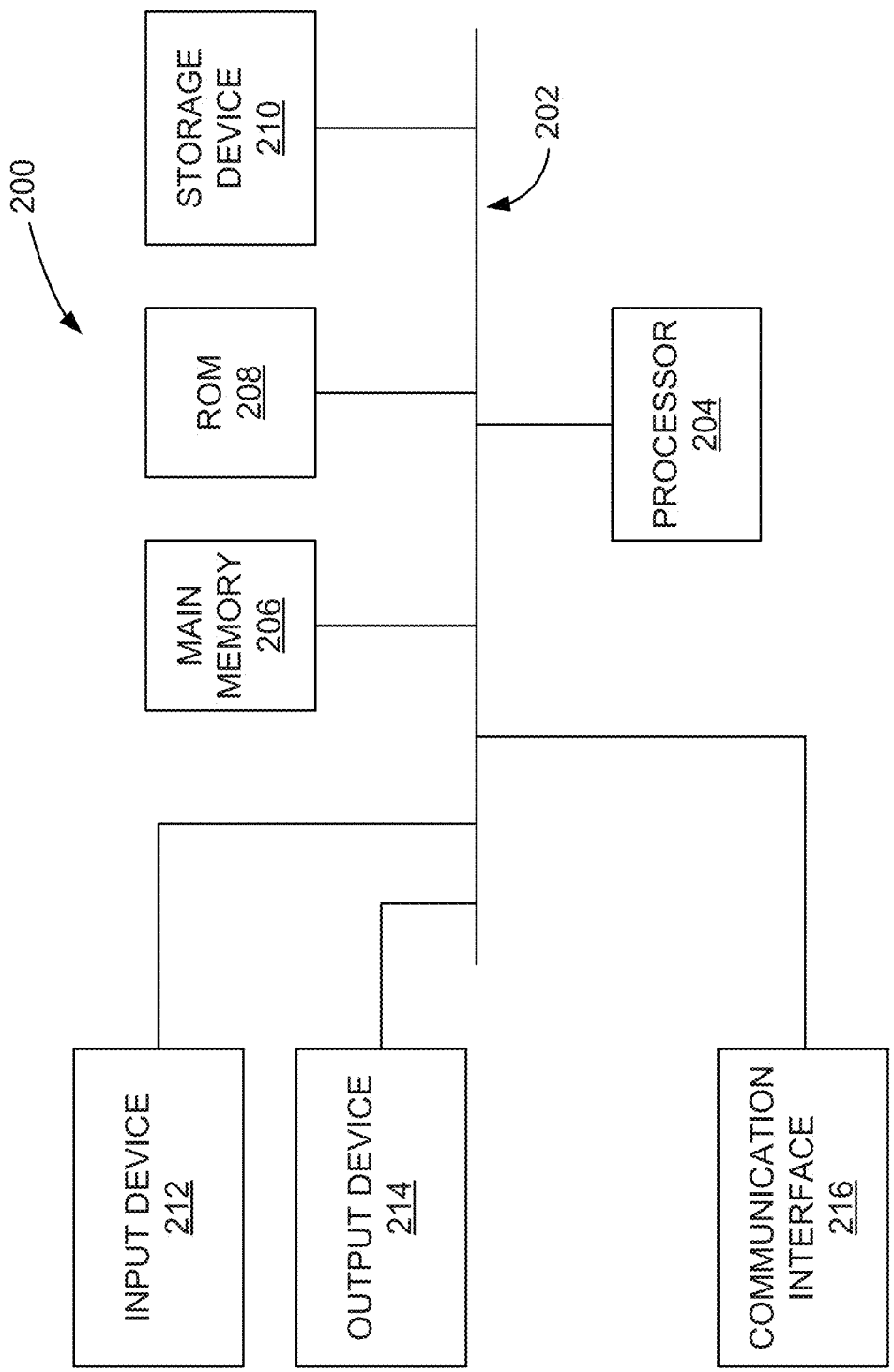
FIG. 2 is a block diagram of a computing device, used for converting static image content to dynamic content, as shown in the advertising environment of FIG. 1.

FIG. 2 is a block diagram of a computing device 200 used for converting static image content to dynamic content, as shown in advertising environment 100 (shown in FIG. 1). In the example embodiment, computing device 200 may be content conversion computer system 116 (shown in FIG. 1), configured to receive a static image content having a plurality of image characteristics, analyze the static image content to determine the plurality of image characteristics, determine a plurality of dynamic content characteristics used for converting the static image content to a dynamic content, and generate the dynamic content based upon the image characteristics and the dynamic content characteristics.

Computing device 200 may represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document. Regardless of the form or implementations, when computing device 200 is operating as content conversion computer system 116 computing device 200 is configured to perform the steps and methods described herein including receiving a static image content having a plurality of image characteristics, analyzing the static image content to determine the plurality of image characteristics, determining a plurality of dynamic content characteristics used for converting the static image content to a dynamic content, and generating the dynamic content based upon the image characteristics and the dynamic content characteristics.

In the example embodiment, computing device 200 could be user access device 108 or any of data processing devices 112 or 114 (shown in FIG. 1). Additionally, as described, computing device 200 may be content conversion computer system 116 and accordingly be configured to perform the steps and methods recited herein. Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
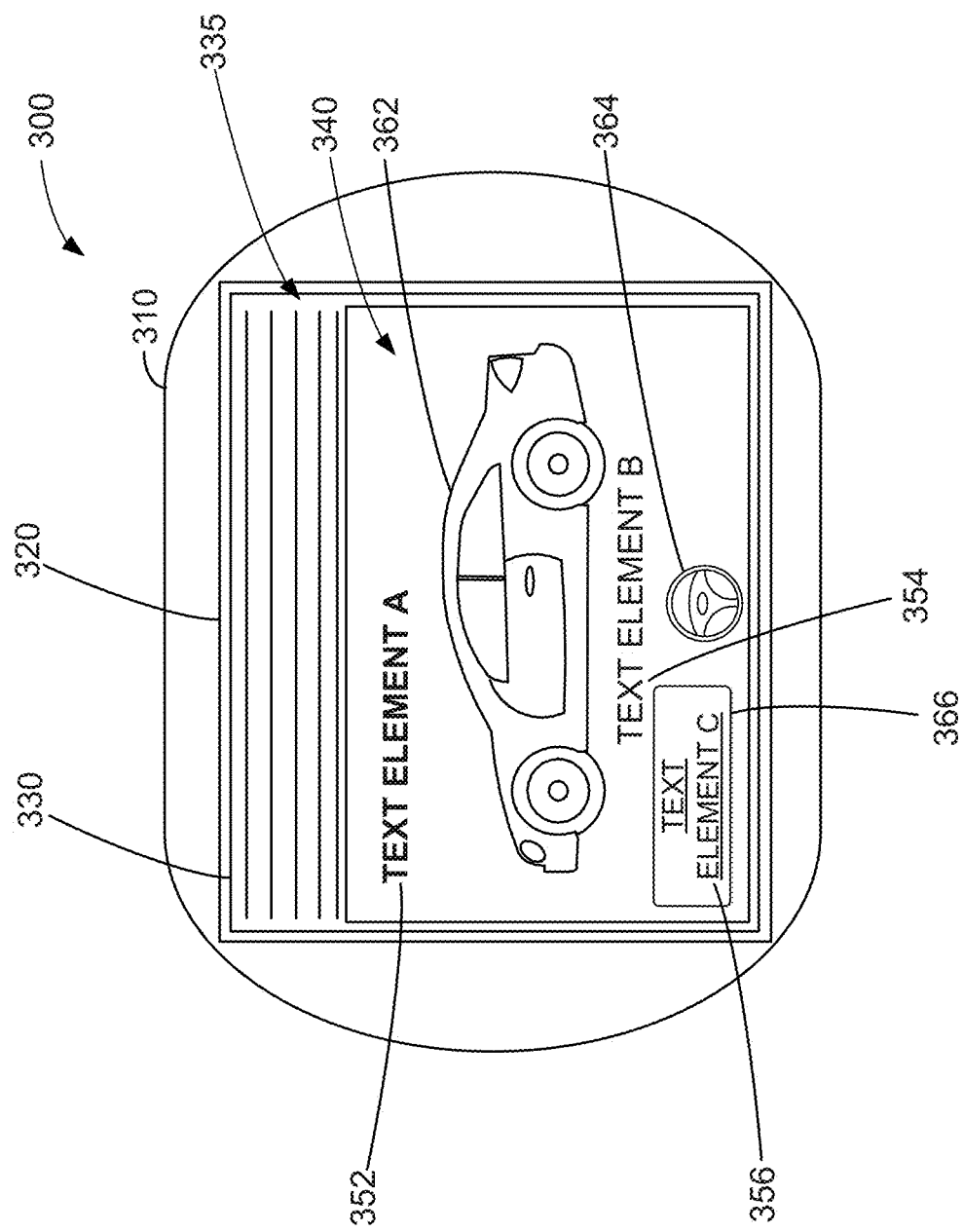
FIG. 3 is an example of static image online content that may be converted to dynamic content using the content conversion computer system of FIG. 2 and the systems and methods described herein.

FIG. 3 is an example 300 of static image online content 340 that may be converted to dynamic content using content conversion computer system 116 (shown in FIG. 2) and the systems and methods described herein. As described above, static image online content 340 may be of any appropriate file format including, for example and without limitation, graphics interchange format (.gif files), joint photographic expert group format (.jpeg files), bitmap image file format (.bmp files), WebP format (.webp files), PostScript format (.ps files), tagged image file format (.tiff files), and any other file format that may be used to encode depictions of images and serve such images.

Example 300 shows a mobile computing device 310 including a display screen 320. Display screen 320 depicts application 330. In the example embodiment, application 330 is a web browser configured to display content from the internet or other network resources. In the example embodiment, application 330 depicts static image online content 340. Static image online content 340 is displayed within an online publication 335. In the example embodiment, online publication 335 is a news article including text. As described above, online publication 335 includes "real estate" for placing online content. Such real estate of online publication 335 may have requirements for dimensions or alternately for ratios of the boundaries (e.g., length and width). Accordingly, only online content with corresponding dimensions or ratios may be effectively served in such real estate. In the example embodiment, the real estate occupied by static image online content 340 is 600 pixels by 400 pixels. If online content of different dimensions is served into such real estate, it will need to be cropped or resized to fit the dimensions. If the ratio does not correspond to the 3:2 ratio of the real estate, even resizing will not serve appropriately because portions of the online content will be "cut off" or alternately empty space will remain in the real estate. Further, online content may be sized in relation to the resolution of an underlying image. If very small online content is expanded to accommodate a larger real estate, the online content may display with undesirable characteristics such as "pixelation". Additionally, particular online publications 335 may further be associated with particular style guidelines. For example particular online publications 335 may only serve content with a particular color palette, with particular animations, or particular fonts and font sizes. As a result, static image online content 340 is limited because it can only be effectively served to particular real estate of particular online publications 335. Further, in at least some examples, computing device 310 and display screen 320 may be associated with certain dimensions and accordingly best present online content of certain sizes or dimensions. Accordingly, some static image online content 340 is not suitable for serving on at least some computing devices 310.

Static image online content 340 further includes a plurality of textual elements 352, 354, and 356 along with a plurality of graphical elements 362, 364, and 366. As described above, textual elements 352, 354, and 356 may be distinguished by characteristics. For example, some textual elements 352, 354, and 356 are "headlines", some are "descriptions", and some are "calls to action." Further, some static image online content 340 may include textual elements 352, 354, and 356 associated with other categories and some static image online content 340 may include a plurality of a particular category of textual elements 352, 354, and 356 such as multiple descriptions or multiple headlines. In the example embodiment, textual element 352 may be identified as a "headline" because of the prominent location (near the top of static image online content 340) and font styling (bold). Further, textual element 354 may be identified as a "description" because of the location (underneath graphical element 362 and localized in the center of static image online content 340) and the font styling (unstyled). Additionally, textual element 356 may be identified as a "call to action" because of the location (on top of graphical element 366 which may be identified as a "button") and the font styling (underlined, a common font style for links). Accordingly, when generating dynamic content based on static image online content 340, such characteristics are recognized by content conversion computer system 116 (shown in FIG. 1) using, for example, optical character recognition (OCR) engines.

Also as discussed above and further below, graphical elements 362, 364, and 366 may be distinguished by characteristics. For example, the locations and color characteristics of graphical elements 362, 364, and 366 may be significant to the design of static image online content 340. Accordingly, when generating dynamic content based on static image online content 340, such characteristics are recognized by content conversion computer system 116 using, for example, edge detection engines and color engines. As described above and herein, edge detection engines allow for the determination of the location of graphical elements 362, 364, and 366 while color engines allow for the determination of color characteristics of graphical elements 362, 364, and 366.

In one example static image online content 340 includes progressions of frames to simulate animation. Accordingly, each underlying frame may have a plurality of textual elements 352, 354, and 356 and a plurality of graphical elements 362, 364, and 366. In such examples, content conversion computer system 116 additionally parses out each frame and applies, for example, OCR engines, edge detection engines, and color engines to each frame. Further, content conversion computer system 116 determines the order of presentation of each frame and the duration of presentation of each frame.

The methods and systems described herein facilitate the conversion of static image online content 340 to dynamic content and thereby allow the serving of such dynamic content in a plurality of online real estate for a plurality of online publications 335.

Figure 4:
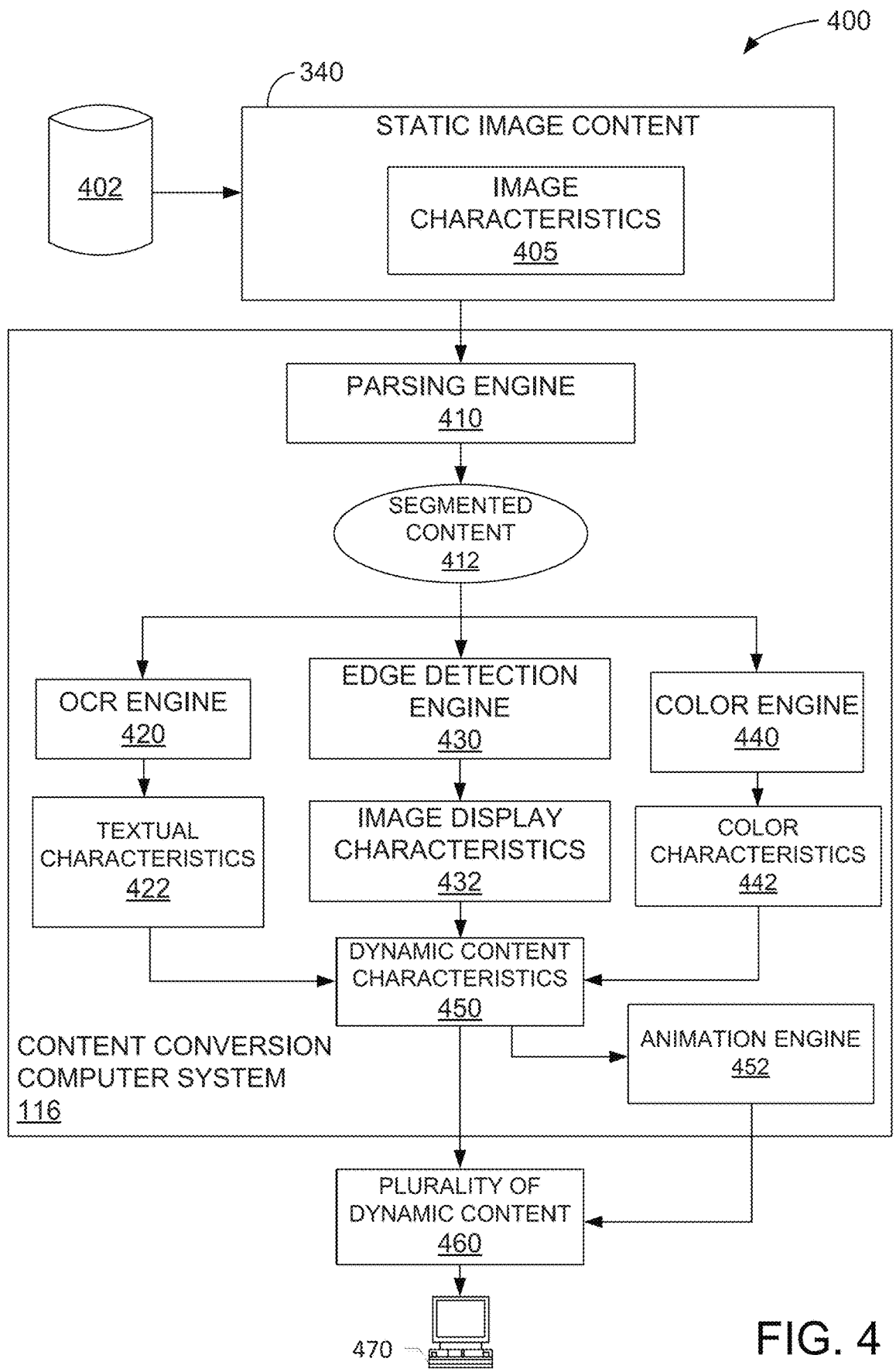
FIG. 4 is an example data flow diagram illustrating the conversion of the static image online content of FIG. 3 to a plurality of dynamic content.

FIG. 4 is an example data flow diagram 400 illustrating the conversion of static image online content 340 to a plurality of dynamic content 460. Conversion of static image online content 340 is facilitated by content conversion computer system 116. In the example embodiment, content conversion computer system is a particular version of data processing system 116 (shown in FIG. 1). Content conversion computer system 116 receives static image online content 340. Static image online content 340 includes a plurality of image characteristics 405. For example, static image online content 340 may include a plurality of textual characteristics, image display characteristics, and color characteristics. Content conversion computer system 116 may receive static image online content 340 from any suitable source including for example and without limitation, online content repository 402, crawling a plurality of web locations, an offline content repository, scanning physical images into static image online content using a scanning device, an advertiser network, online publications, and an online merchant (none shown). In the example embodiment, content conversion computer system 116 receives static image online content 340 from online content repository 402.

Content conversion computer system 116 is configured to analyze details of the static image online content 340. More specifically, content conversion computer system 116 identifies at least some of plurality of image characteristics 405 associated with static image online content 340. Accordingly, content conversion computer system 116 is capable of identifying textual characteristics, image display characteristics, and color characteristics. Content conversion computer system 116 includes a plurality of components that are used to identify plurality of image characteristics 405. In the example embodiment, content conversion computer system 116 analyzes the content of static image online content 340 and identifies a background area, at least one image area such as a "product image area", and text blocks using a parsing engine 410. Content conversion computer system 116 may use machine vision algorithms, optical character recognition, edge detection algorithms, color analysis algorithms, and any other suitable algorithm or method to effect parsing engine 410 identifying such areas of static image online content 340. Accordingly, static image online content 340 is segmented into segmented content 412 where each area of static image online content 340 is pre-processed for further analysis. In at least some examples, as described herein, static image online content 340 includes a plurality of images or "frames" displayed in progression. Parsing engine 410 is also configured to separate each "frame" from such "animated" static image online content 340 to identify a plurality of underlying static image online content 340, identify the display order of such underlying static image online content 340, and identify the duration associated with the display of each underlying static image online content 340. Upon such differentiation, each frame is analyzed individually using the methods described herein.

In the example embodiment, content conversion computer system 116 uses an optical character recognition (OCR) engine 420 to identify textual characteristics 422 of static image online content 340. Depending upon the condition of static image online content 340 and the legibility of textual elements 352, 354, and 356 (shown in FIG. 3), content conversion computer system 116 may use a pre-processing method during the execution of OCR engine 420 to improve the quality of the textual recognition. Accordingly, content conversion computer system 116 may apply deskewing, despeckling, binzarization, line removal, layout analysis, zoning, line and word detection, character isolation or segmentation, normalization of aspect ratio or scale, or any other suitable pre-processing methods. After pre-processing, content conversion computer system 116 may apply an OCR algorithm such as matrix matching or feature extraction to make determinations on the characters displayed within static image online content 340. Alternately, any OCR algorithm is used to determine the characters displayed in static image online content 340. Further, content conversion computer system 116 may use algorithms to distinguish the formatting and size of words within static image online content 340 including, for example, determining the presence of bold characters, determining the location and spacing of characters, determining the presence of italicized characters, determining the presence of underlined characters, determining the presence of superscripted characters, determining the presence of subscripted characters, determining font sizes associated with characters, and determining font faces associated with characters. Additionally, content conversion computer system 116 may apply post processing methods and algorithms to verify determinations made by the OCR algorithms during the execution of OCR engine 420. For example, a particular static image online content 340 is known to be associated with certain key terms because it is associated with a particular merchant. Accordingly, a lexicon is applied to verify that words identified by OCR engine 420 correspond to words associated with that merchant. OCR engine 420 accordingly allows the content conversion computer system 116 to identify textual elements, formatting and styling related to textual elements, and placement of textual elements. More generally, content conversion computer system 116 identifies all such properties as textual characteristics 422. As described below, during generation of dynamic content 460, content conversion computer system 116 can substantially place, style, and format the textual elements in a similar manner within dynamic content 460 as was displayed in static image online content 340 using textual characteristics 422. As described above, in the example embodiment, OCR engine 420 analyzes text contained within the "text blocks" identified by parsing engine 410 and separated into segmented content 412. In alternative embodiments, OCR engine 420 may analyze all textual elements available within static image online content 340.

Content conversion computer system 116 also uses an edge engine 430 to determine image display characteristics 432 of static image online content 340. As used herein, edge engine or edge detection engine 430, refers to at least one method for identifying characteristics within a digital image to find discontinuities. In at least some examples, edge detection engines 430 examine digital images such as static image online content 340 to find significant changes in brightness characteristics. At such points of brightness changes (or other discontinuities), "features" of an image can be separated. Accordingly, edge detection engine 430 can identify the boundaries of images components within static image online content 340. For example, in at least a variety of static image online content 340, multiple interior images are included such as images 362, 364, and 366 (shown in FIG. 3). Such interior images may include, for example, depictions of a product or service, a corporate logo, photographs of humans using goods and services related to static image online content 340, and "call to action" graphics such as buttons. Edge detection engine 430 allows each interior image or "feature" to be identified. Upon determining the boundaries and positions of such interior images or features, the content conversion computer system 116 can further extract each interior image or feature while also identifying the absolute and relative position of such features within static image online content 340. Extraction is performed using any suitable method including, for example, cropping, cutting, and copying of the features based upon boundaries identified by edge detection engine 430. In the example embodiment, extraction includes cropping features identified by edge detection engine 430 and is additionally performed by edge detection engine 430. As described below, the interior image or feature can then be placed at an absolute or relative position similar to the identified position within generated dynamic content 460. As described above, in the example embodiment, edge engine 430 analyzes image characteristics contained within the "image areas" identified by parsing engine 410 and segmented into segmented content 412. In alternative embodiments, edge engine 430 may analyze all image characteristics available within static image online content 340.

Content conversion computer system 116 additionally uses color engine 440 to determine color characteristics 442 related to static image online content 340. As used herein, color engine 440 refers to at least one method for identifying dominant colors and their associated "weights" within static image online content 340. In the example embodiment, color engine 440 analyzes color in the "image areas" identified by parsing engine 410 and segmented into segmented content 412. In alternative embodiments, color engine 440 analyzes entire static image online content 340. Color engine 440 may apply any appropriate method including, for example, clustering algorithms, k-means algorithms, or any other suitable color identification and analysis methods and algorithms.

Using edge engine 430 and OCR engine 420, content conversion computer system 116 identifies attributes associated with textual elements 352, 354, and 356. As described above, in at least some static image online content 340, a variety of textual elements 352, 354, and 356 are included. For example, a primary textual element or a "headline" may be included wherein the headline states a primary slogan, statement, or identifier associated with the static image content. In a second example, a secondary textual element or a "description" may be included wherein the description provides details related to the static image content. In a third example, a tertiary textual element or a "call to action" may be included wherein the call to action invites a viewer such as a customer to click on a button or a link to navigate to, for example, an online merchant associated with the static image content. Accordingly, edge engine 430 and OCR engine 420 of content conversion computer system 116 identify all such textual elements 352, 354, and 356 and associated textual characteristics 422 described above to determine headline text, description text, and call to action text. Content conversion computer system 116 may additionally use edge engine 430 and OCR engine 420 to determine other specified textual elements including, for example, a textual company logo, a contact email address, a contact phone number, and a contact physical address. A textual company logo may be distinguished based upon, for example, font size, location, and font type. Alternately, a textual company logo may be distinguished by comparison of the characters to a lexicon. Email addresses, phone numbers, and physical addresses may be distinguished based upon the standardized formatting of the characters into recognizable patterns such as a seven or ten digit phone number using hyphens, periods, and parentheses as delimiters, an email address using "@" as an identifier of a domain, and the presence of a state code or a postal code.

Content conversion computer system 116 additionally determines a plurality of dynamic content characteristics 450 to be used for converting static image online content 340 to dynamic content 460. The plurality of dynamic content characteristics 450 include, for example, dimensions associated with plurality of dynamic content 460, animation templates associated with plurality of dynamic content 460, and styles and formatting characteristics associated with plurality of dynamic content 460. Dynamic content characteristics 450 may be retrieved from memory of content conversion computer system 116 such as memory 206 (shown in FIG. 2), a content server such as ad serving system 120 (shown in FIG. 1), a database such as database 126 (shown in FIG. 1), or any other computing device in communication with content conversion computer system 116.

Content conversion computer system 116 generates dynamic content 460 based upon image characteristics 405 (and, further, textual characteristics 422, image display characteristics 432, and color characteristics 442) and dynamic content characteristics 450. Generating dynamic content 460 substantially represents applying previously determined image characteristics 405, textual characteristics 422, image display characteristics 432, color characteristics 442, and dynamic content characteristics 450 to create plurality of dynamic content 460. In the example embodiment, dynamic content 460 is generated by building styles based upon a combination of determined image characteristics 405 textual characteristics 422, image display characteristics 432, color characteristics 442, and dynamic content characteristics 450. Building styles further includes selecting at least one size and orientation for each dynamic content 460, at least one font type for textual elements 352, 354, and 356, at least one font size for textual elements 352, 354, and 356, at least one location for image elements 362, 364, and 366, and at least one color scheme for image elements 362, 364, and 366 and textual elements 352, 354, and 356. Further, building styles may also include selecting to animate at least a portion of dynamic content 460. After building styles, content conversion computer system 116 builds a plurality of dynamic content 460. Plurality of dynamic content 460 may be associated with different sizes and orientations, different font types, different font sizes, different image element locations, different animations, and different color schemes. Accordingly, content conversion computer system 116 may substantially generate dynamic content 460 with a variety of presentation styles, presentation sizes, and presentation appearances. Such a plurality of dynamic content 460 may be useful in serving suitable online content to a variety of real estate for a variety of online publications. In at least one example, each generated dynamic content 460 is inventoried for its characteristics. Accordingly, when a content server chooses dynamic content 460 to serve into a particular piece of real estate for a particular online publication, characteristics for serving may be easily identified. For example, a particular piece of real estate for a particular online publication may have a known requirement of animation, a requirement for a particular size and orientation, and a requirement for particular color scheme. A content server can accordingly identify the appropriate dynamic content from the plurality of dynamic content 460 based upon the inventoried data. In at least one example, such inventoried data regarding the characteristics of dynamic content 460 is included as metadata within dynamic content 460. In other examples, the inventoried data is included in a database, a file, or any other suitable form.

In one example, generating dynamic content 460 includes generating a plurality of HTML 5 content with a plurality of distinct sizes, dimensions, and orientations. In other examples, dynamic content 460 can be generated as HTML 4 content or any other appropriate content format including subsequent or preceding versions of HTML. In a second example, generating dynamic content 460 includes generating a plurality of HTML 5 content with at least one animation. In the example embodiment, dynamic content 460 is generated by using an animation engine 452 configured to apply at least one custom animation style to at least a portion of dynamic content 460. In other examples, dynamic content 460 can be generated as HTML 4 content or any other appropriate content format including subsequent or preceding versions of HTML. The animation, as referenced above and described below, is selected based upon dynamic content characteristics 450. For example, dynamic content 460 characteristics may indicate that dynamic content 460 include a "fade in", a "fade out", a "highlight", or any other suitable form of animation. Such animation is applied to at least a portion of at least one of the plurality of dynamic content 460. Such indications of animation may be explicitly identified by a textual indicator within dynamic content characteristics 450. Alternately, such indications may be defined in any other suitable manner.

Upon generation of plurality of dynamic content 460, content conversion computer system 116 transmits plurality of dynamic content 460 to at least one content recipient 470. Content recipient 470 may include any suitable recipient including data processing system 112 associated with advertisers 102, data processing system 114 associated with publishers 104, data processing system 116 associated with content management system 106 (all shown in FIG. 1), or any other appropriate entity. In the example embodiment, content recipient is data processing system 114 associated with publishers 104.

Figure 5:
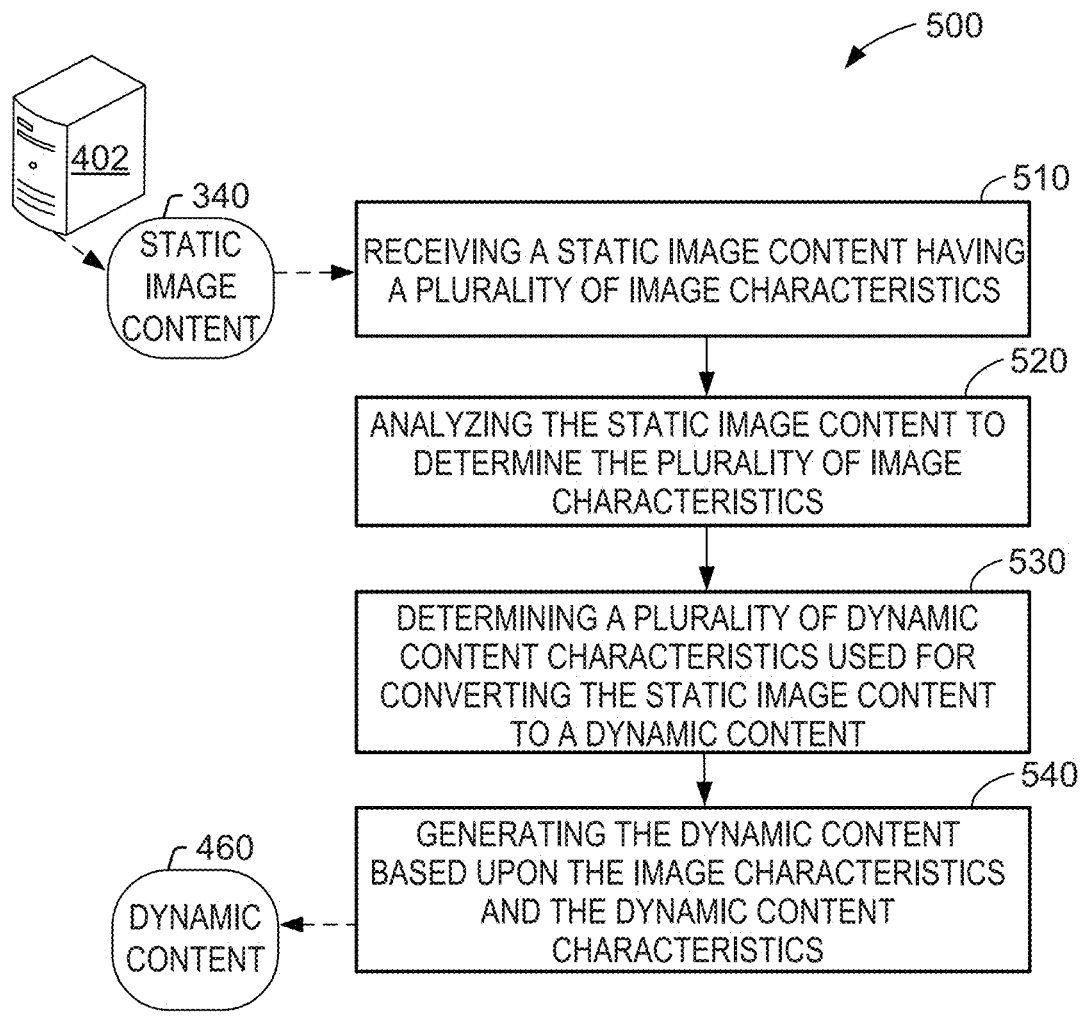
FIG. 5 is an example method for converting static image online content to dynamic content using the environment of FIG. 1.

FIG. 5 is an example method 500 for converting static image online content 340 to plurality of dynamic content 460 using environment 100 (shown in FIG. 1). Method 500 is implemented by content conversion computer system 116. Content conversion computer system 116 receives 510 a static image content having a plurality of image characteristics. Receiving 510 represents content conversion computer system receiving at least one static image online content 340 from, for example online content repository 402. Static image online content 340 is associated with a plurality of image characteristics 405 (shown in FIG. 4).

Content conversion computer system 116 analyzes 520 the static image online content to determine the plurality of image characteristics. Analyzing 520 represents content conversion computer system 116 identifying textual characteristics 422, image display characteristics 432, and color characteristics 442 (all shown in FIG. 4) associated with static image online content 340.

Content conversion computer system 116 determines 530 a plurality of dynamic content characteristics used for converting the static image content to a dynamic content. Determining 530 represents content conversion computer system 116 retrieving plurality of dynamic content characteristics 450 (shown in FIG. 4). Content conversion computer system 116 may retrieve dynamic content characteristics 450 from, for example, memory 206 (shown in FIG. 2) of content conversion computer system 116, a content server, an external database, or any computing device in communication with content conversion computer system 116.

Content conversion computer system 116 generates 540 the dynamic content based upon the image characteristics and the dynamic content characteristics. Generating represents content conversion computer system 116 creating a plurality of dynamic content 460. In the example embodiment, plurality of dynamic content 460 includes HTML content of varying dimensions, styles, and animations (including the presence and lack of animation).

Figure 6:
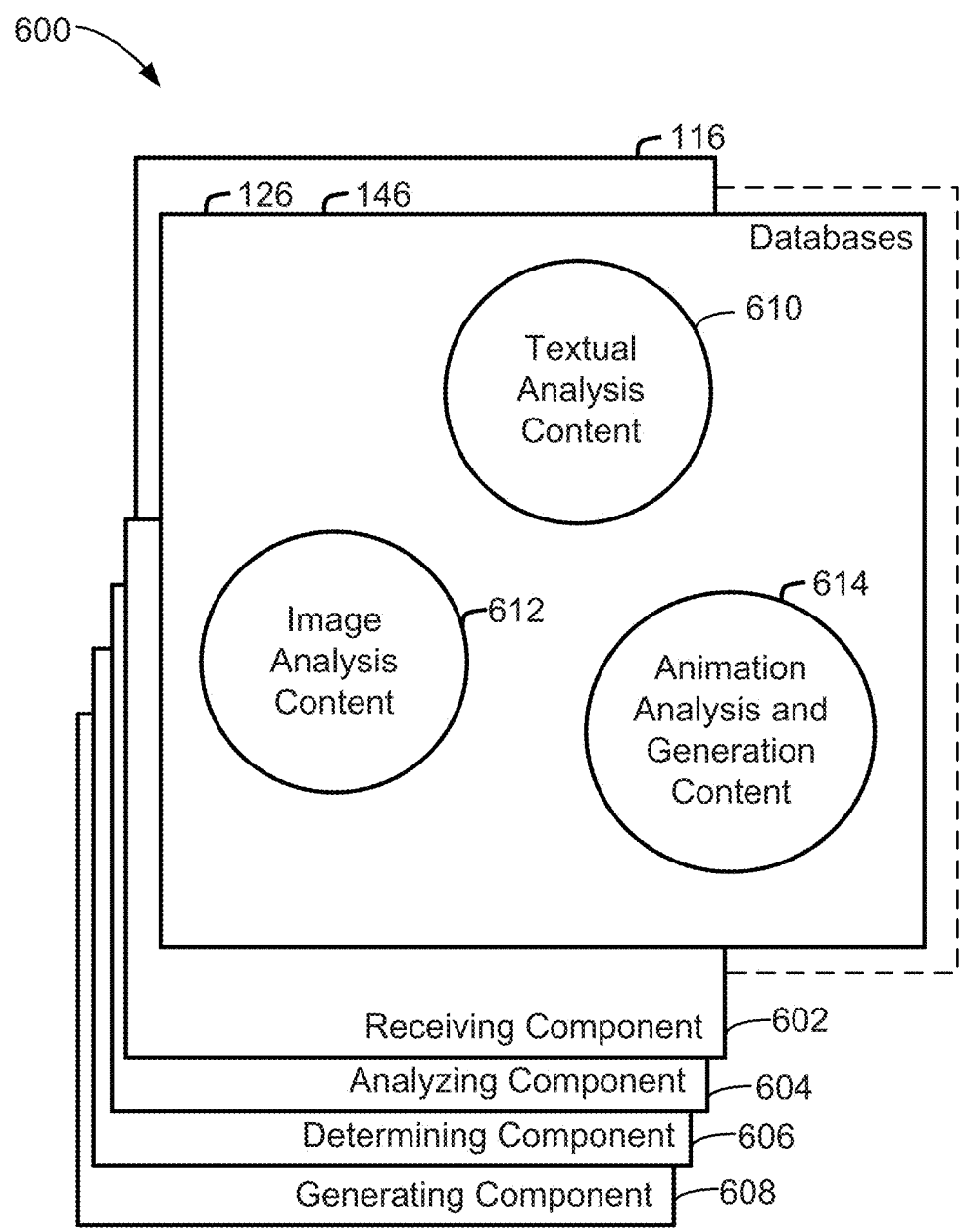
FIG. 6 is a diagram of components of one or more example computing devices that may be used in the environment shown in FIG. 1.

FIG. 6 is a diagram 600 of components of one or more example computing device such as content conversion computer system 116 (shown in FIG. 1) that may be used in environment 100 (shown in FIG. 1).

For example, one or more of computing devices 200 may form advertising management system (AMS) 106, customer computing device 108 (both shown in FIG. 1), and content conversion computer system 116. FIG. 6 further shows a configuration of databases 126 and 146 (shown in FIG. 1). Databases 126 and 146 are coupled to several separate components within AMS 106, content provider data processing system 112, and customer computing device 108, which perform specific tasks.

Content conversion computer system 116 includes a receiving component 602 for receiving a static image content having a plurality of image characteristics. Content conversion computer system 116 additionally includes an analyzing component 604 for analyzing the static image content to determine the plurality of image characteristics. Content conversion computer system 116 further includes a determining component 606 for determining a plurality of dynamic content characteristics used for converting the static image content to a dynamic content. Content conversion computer system 116 also includes a generating component 608 for generating the dynamic content based upon the image characteristics and the dynamic content characteristics.

In an exemplary embodiment, databases 126 and 146 are divided into a plurality of sections, including but not limited to, a textual analysis section 610, an image analysis content section 612, and an animation analysis and generation content section 614. These sections within database 126 and 146 are interconnected to update and retrieve the information as required.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for generating different-sized content items, the method comprising:
   retrieving one or more graphical elements and one or more textual elements of a content provider;
   determining textual characteristics of the one or more textual elements;
   determining image display characteristics and color characteristics of the one or more graphical elements;
   identifying a first size from a plurality of predefined sizes;
   generating, responsive to identifying the first size and using the textual characteristics, the image display characteristics and the color characteristics, a first content item of the content provider having the first size, the first content item including a first subset of the one or more textual elements and the one or more graphical elements;
   identifying a second size from the plurality of predefined sizes, the second size different from the first size; and
   generating, responsive to identifying the second size and using the textual characteristics, the image display characteristics and the color characteristics, a second content item of the content provider having the second size, the second content item including a second subset of the one or more textual elements and the one or more graphical elements different from the first subset of the one or more textual elements and the one or more graphical elements.

2. The method of claim 1, further comprising:
   identifying a first template of a plurality of templates to generate the first content item; and
   generating the first content item using the first template.

3. The method of claim 2, wherein each template of the plurality of templates defines a respective location, within content items generated using the template, for at least one of the one or more graphical elements and the one or more textual elements.

4. The method of claim 1, further comprising:
   identifying a second template of the plurality of templates to generate the first content item; and
   generating the second content item using the second template.

5. The method of claim 4, wherein each template of the plurality of templates defines a respective location, within content items generated using the template, for at least one of the one or more graphical elements and the one or more textual elements.

6. The method of claim 1, further comprising determining at least one of a headline text and description text among the one or more textual elements.

7. The method of claim 1, wherein determining the image display characteristics comprises using an edge detection engine.

8. The method of claim 1, wherein the first content item and the second content item include HTML content items.

9. The method of claim 1, wherein the first content item and the second content item include animated HTML content items.

10. A computer system for generating different-sized content items, the computer system comprising:
    a memory for storing data; and
    a processor in communication with the memory, said processor programmed to:
      retrieve one or more graphical elements and one or more textual elements of a content provider;
      determine textual characteristics of the one or more textual elements;
      determine image display characteristics and color characteristics of the one or more graphical elements;
      identify a first size from a plurality of predefined sizes;
      generate, responsive to identifying the first size and using the textual characteristics, the image display characteristics and the color characteristics, a first content item of the content provider having the first size, the first content item including a first subset of the one or more textual elements and the one or more graphical elements;
      identify a second size from the plurality of predefined sizes, the second size different from the first size; and
      generate, responsive to identifying the second size and using the textual characteristics, the image display characteristics and the color characteristics, a second content item of the content provider having the second size, the second content item including a second subset of the one or more textual elements and the one or more graphical elements different from the first subset of the one or more textual elements and the one or more graphical elements.

11. The computer system of claim 10, wherein the processor programmed to:
    identify a first template of a plurality of templates to generate the first content item; and
    generate the first content item using the first template.

12. The computer system of claim 11, wherein each template of the plurality of templates defines a respective location, within content items generated using the template, for at least one of the one or more graphical elements and the one or more textual elements.

13. The computer system of claim 10, wherein the processor programmed to:
 identify a second template of the plurality of templates to generate the first content item; and
 generate the second content item using the second template.

14. The computer system of claim 13, wherein each template of the plurality of templates defines a respective location, within content items generated using the template, for at least one of the one or more graphical elements and the one or more textual elements.

15. The computer system of claim 10, wherein the processor programmed to:
 determine at least one of a headline text and description text among the one or more textual elements.

16. The computer system of claim 10, wherein in determining the image display characteristics, the processor programmed to:
 use an edge detection engine.

17. The computer system of claim 10, wherein the first content item and the second content item include HTML content items.

18. The computer system of claim 10, wherein the first content item and the second content item include animated HTML content items.

19. A non-transitory computer-readable storage device, having processor-executable instructions embodied thereon, for generating different-sized content items, the processor-executable instructions, when executed by a computer, cause the computer to:
 retrieve one or more graphical elements and one or more textual elements of a content provider;
 determine textual characteristics of the one or more textual elements;
 determine image display characteristics and color characteristics of the one or more graphical elements;
 identify a first size from a plurality of predefined sizes;
 generate, responsive to identifying the first size and using the textual characteristics, the image display characteristics and the color characteristics, a first content item of the content provider having the first size, the first content item including a first subset of the one or more textual elements and the one or more graphical elements;
 identify a second size from the plurality of predefined sizes, the second size different from the first size; and
 generate, responsive to identifying the second size and using the textual characteristics, the image display characteristics and the color characteristics, a second content item of the content provider having the second size, the second content item including a second subset of the one or more textual elements and the one or more graphical elements different from the first subset of the one or more textual elements and the one or more graphical elements.

20. The non-transitory computer-readable storage device of claim 19, wherein the processor-executable instructions further cause the computer to:
 identify a first template of a plurality of templates to generate the first content item, each template of the plurality of templates defining a respective location, within content items generated using the template, for at least one of the one or more graphical elements and the one or more textual elements;
 generate the first content item using the first template;
 identify a second template of the plurality of templates to generate the first content item; and
 generate the second content item using the second template.

* * * * *